United States Patent [19]

Densmore

[11] 3,851,752

[45] Dec. 3, 1974

[54] SELF-TROUGHED CONVEYOR BELT REVERSING APPARATUS AND METHOD

[76] Inventor: Neal W. Densmore, 452 Wendy Way, Franklin, Pa. 16323

[22] Filed: May 3, 1973

[21] Appl. No.: 356,843

[52] U.S. Cl................. 198/192, 198/201, 198/233
[51] Int. Cl............................................ B65g 15/08
[58] Field of Search ............ 198/192, 202, 233, 201

[56] References Cited
UNITED STATES PATENTS

| | | | |
|---|---|---|---|
| 858,612 | 7/1907 | Mason | 198/192 |
| 2,264,332 | 12/1941 | Peterson | 198/201 |
| 2,568,174 | 9/1951 | Staacke | 198/192 |
| 2,592,581 | 4/1952 | Lorig | 198/202 |
| 2,642,984 | 6/1953 | Mercier | 198/233 |
| 2,976,982 | 3/1961 | Murphy | 198/192 |
| 3,011,623 | 12/1961 | Manthorp | 198/192 |
| 3,075,633 | 1/1963 | Presti | 198/192 |
| 3,161,282 | 12/1964 | Koski | 198/192 |
| 3,196,701 | 7/1965 | Morrow | 198/202 |

Primary Examiner—Richard A. Schacher
Assistant Examiner—Richard K. Thomson

[57] ABSTRACT

A method and apparatus for reversing a transversely flexible, self-troughed belt by using a crowned pulley to reduce the side height of the troughed belt while in contact with the crowned pulley resulting in a reduced vertical dimension of the conveyor belt reversing terminal compared to prior art reversing terminals for such a belt.

10 Claims, 4 Drawing Figures

3,851,752

SELF-TROUGHED CONVEYOR BELT REVERSING APPARATUS AND METHOD

In the field of mining it is well known to remove mined material from a mine face by the use of a mining machine and a series of conveyors, the first of which is the conveyor of the mining machine itself. To effect continuous mining it has been found desirable to provide a flexible belt transfer conveyor connected to or otherwise movable with the miner so that when the miner moves forward in progressive mining the transfer conveyor moves forward with its receiving terminal continually positioned beneath the delivery end of the miner conveyor. The delivery terminal at the opposite end of the transfer conveyor is arranged to straddle or otherwise feed onto a panel conveyor communicating with the general conveyor system of the mine for delivery of the mined material outside of the mine. Since the transfer conveyor belt must be reversed at each of the conveyor terminals it is necessary to have the belt trained about a reversing and/or driving pulley at each end of the transfer conveyor.

In the case of a self-troughing belt the side height of the belt must be considerable to keep the mined material from falling off the edges thereof particularly when such a belt is laterally flexible and the mined material must be carried around curves on its way from the miner to the panel belt. When such a self-troughed belt is trained about a reversing pulley it is obvious that the height of the terminal containing such a reversing pulley must be at least equal to the diameter of the pulley plus twice the side height of the belt plus any necessary clearance, since the upstanding edges of the belt will extend above the pulley on the load run of the belt and below the pulley on the return run of the belt as is well known.

The present invention is directed to the use of a crowned pulley for reversing and/or driving such a troughed belt wherein the crown of the pulley acting upwardly on the center of the belt on the load run side of the reversing pulley will reduce the height of the belt by approximately 25 percent. A similar reduction in the side height of the belt is applied on the return run side of the pulley with the result that a total reduction in terminal height equal to approximately one-half the side height of the belt is made possible.

This and other objects and advantages of the method and apparatus of this invention will be more readily apparent upon consideration of the following description and drawings in which.

Figure 2:
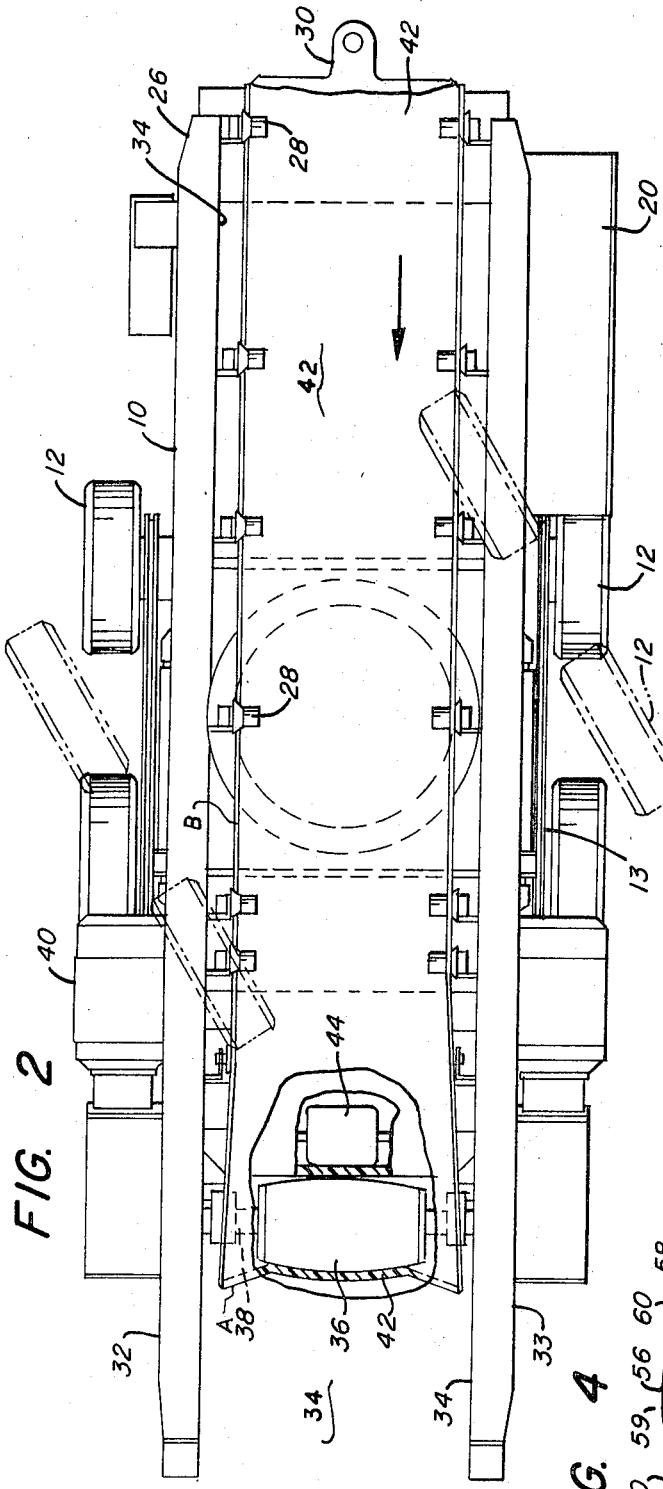
FIG. 2 is a top plan view of the terminal car of FIG. 1.

In FIG. 2 there is shown a belt reversing and driving vehicle exemplified in outby tractor 10 supported by a traction assembly 22 comprising a frame 13 and four wheels 12 resting upon the floor 14 of a mine or other horizontal surface and rendered movable thereover by power supplied to the wheels 12 as by chains 16 energized by a motor (not shown) in any suitable manner under control of electrical switch gear (not shown) mounted in a control box 20 in a well known manner. Pairs of wheels 12 on a given side of the tractor 10 are connected together and driven simultaneously and synchronously by common drive chains 18 so that both of the wheels on one side of the tractor 10 are driven together under control of a single motor while the pair of the wheels on the other side of the tractor 10 are separately controlled and synchronized with each other. Pivotably mounted upon the traction assembly 22 by way of a turn table 24 is belt supporting and guiding frame 26 provided with a plurality of belt supporting and guiding roller sets 28 the same as or similar to those described and shown in copending application Ser. No. 329,629 filed Feb. 5, 1973 which application is assigned to the same assignee as is this application.

Figure 3:
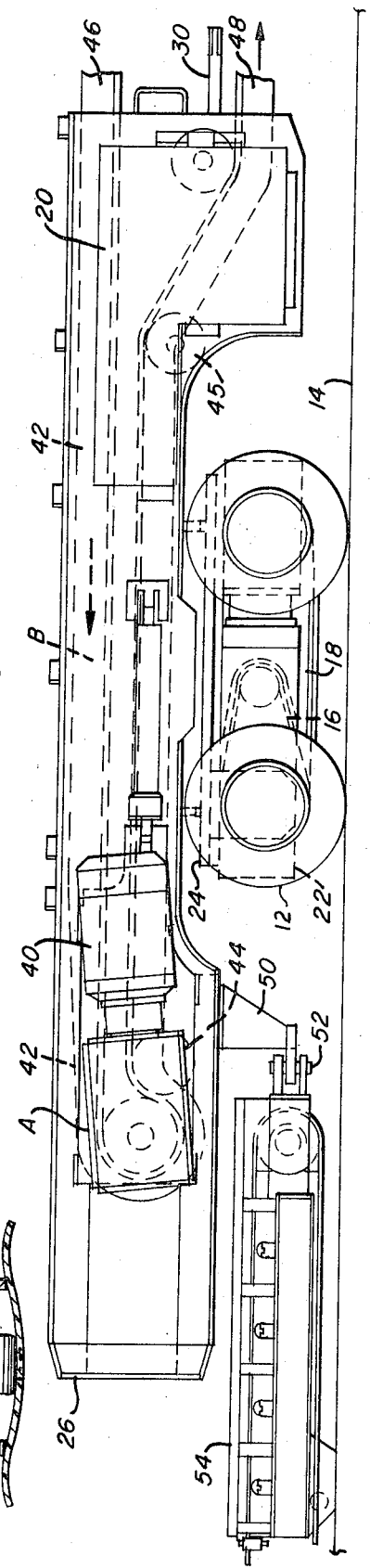
FIG. 3 is a side elevational view of the terminal car of FIG. 1 additionally comprising a fragment of panel conveyor operatively connected to such a terminal car.

The forward or inby end of the tractor 10 (to the right as seen in FIGS. 2 and 3) is provided with a short tongue 30 engagable with a pin and clevice (not shown) at the outby end of a train of conveyor cars such as those described and illustrated in the above cited copending application. The frame 26 comprises side pieces 32 and 33 left hand and right hand respectively suitably connected together by cross bracing to hold the side pieces 32 and 33 parallel and spaced apart to form a belt receiving trough 34 therebetween which extends the full length of the tractor 10. Near the left hand end of the tractor 10 as seen in FIG. 2 there is rotatably mounted a rubber covered belt reversing and driving pulley assembly 36 supported on a drive shaft 38 in turn rotatably supported and driven by gear motors 40 mounted on the outer surfaces of the side pieces 32 and 33, respectively. Supported by the roller sets 28 and reversibly trained about the pulley assembly 36 in a selftroughing laterally flexible belt 42 extending lengthwise through the trough 34, reversibly wrapped about the pulley 36 and held in substantially two-thirds or 240° wrap contact therewith by an idler pulley 44 in a manner well known in the art of conveyor belt driving. The belt 42 thus situated is driven so that its upper or conveying run 46 travels from right to left as seen in FIGS. 2 and 3 while the lower or return run 48 supported as by idler rollers 44 and 45 travels from left to right as seen in FIG. 3.

Figure 1:
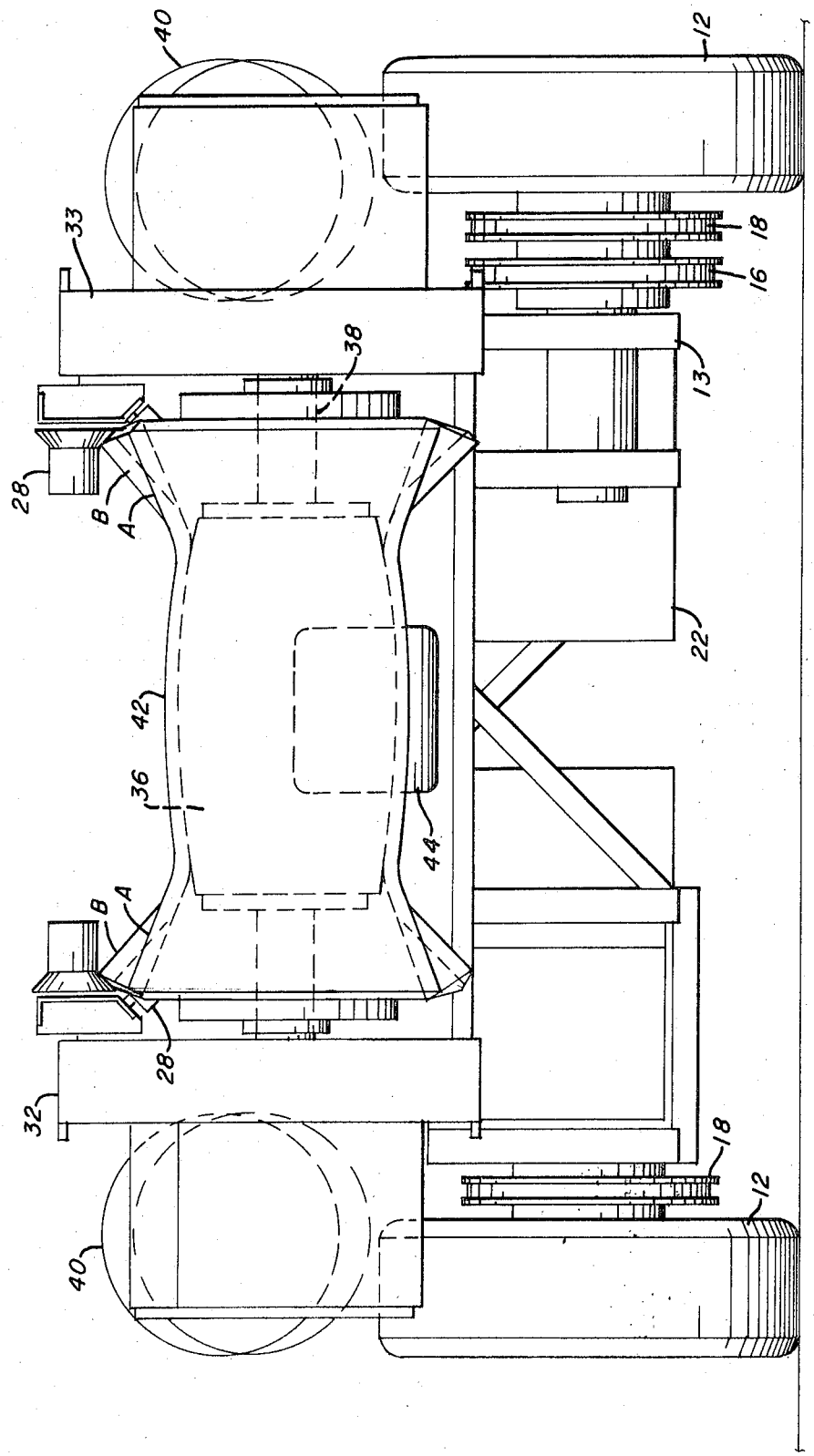
FIG. 1 is an end elevational view of a conveyor terminal car constructed according to the principles of this invention.

As best seen in FIG. 1 the pulley 36 has a crowned surface with a radius of curvature equal to approximately four times the major diameter of the pulley 36. As may be seen best in FIG. 1 the crowning of pulley 36 acts to raise the center of the belt 42 as it approaches and contacts the upper surface of the pulley 36 and maintains the center of the belt 42 at a greater distance from the axis of the pulley 36 than are the edges of the flat bottom portion of the belt 42. The center of the belt 42 having been raised it is to be seen that the edge portions of the self-troughing belt 42 have been correspondingly lowered so that the side height at the position (A) where the belt is in contact with the roller 36 is approximately 75 percent of the troughed belt side height at position (B) which exemplifies any part of the belt removed from the direct influence of the pulley 36. It is this reduction of the belt side height which reduces the vertical dimension of the reversing belt and pulley combination and provides the main advantage of the instant invention.

As seen in FIG. 3 a downwardly extending bracket 50 mounted on the bottom side of the frame 26 connects by way of tongue clevis and pin assembly 52 with a panel belt troughing conveyor 54 of a type well known in the art which being situated below the reversing portion of the belt 42 and being powered to move its upper conveying run from right to left is positioned to accept the mined material conveyed by the belt 42 to the unloading point on the outer side of the pulley 36 in a well known cascade relationship. The conveyor 54 is suitably tensioned but slidably mounted so that as the mining machine advances, carrying with it the flexible conveyor train of which the outby tractor 10 is the outermost portion, the conveyor 54 extends along with the motion of the outby tractor 10 to provide continuous conveying of the mined material produced by the mining machine.

It is to be realized that the crowned pulley assembly of this invention is also intended for use at the receiving end of the flexible conveyor train by mounting on an inby tractor, or other reversing pulley supporting vehicle, with the same reduction of belt side height and of the vertical dimension of the reversing assembly as that above described for the outby tractor and its reversing assembly. In such case the pulley assembly of this invention would not be a drive pulley and need not be rubber covered but may be low friction metal or plastic surface as desired.

The particular design of the outby tractor as above described is only exemplary and is not to be taken as limitative upon the application of the principles of this invention in the crowned pulley as above described.

The crowned pulley assembly of this invention may also be used with an outby tractor which straddles the panel belt as well as with one which employs a bridge conveyor to deliver the mined material from the self-troughed belt to a permanently installed panel belt of well known design.

It is further to be realized that, although the crown of the pulley assembly above described has been indicated as having a radius of approximately four times the diameter of the pulley, this invention would cover the use of significantly smaller ratio of crown radius to pulley diameter with a proportionate increase in the lowering of the standard side height and a corresponding greater advantage in reduction of the vertical dimension of the reversing assembly within which such a crowned pulley would be used.

Figure 4:
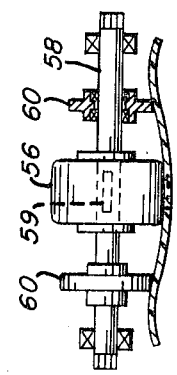
FIG. 4 is a fragmentary view of a second embodiment of the belt reversing apparatus of this invention.

A second embodiment of the principles of this invention, particularly useful where a crown radius of substantially less than four times the diameter of the pulley is desired, can be seen in FIG. 4 wherein the drive pulley 36 of FIG. 2 for example is replaced by a relatively narrow drive pulley 56 secured in keyed relationship to a drive shaft 58, and two relatively narrow freely rotatable idler pulleys 60 of smaller diameter than the drive pulley 56 and spaced therefrom along the drive shaft 58 by amounts such that the overall axial dimension (effective length) of the three pulley assembly (60, 59 and 60) is the same as the axial dimension (effective length) of the pulley 36 of the first embodiment. The effective radius of curvature of the pulley assembly of FIG. 4 will be the radius of a circular arc which includes three axially aligned peripheral points on a pulley 60, the pulley 56 and a second pulley 60, respectively, when the two pulleys 60 are of equal diameter and substantially smaller diameter than the pulley 56. With the side pulleys 60 of the free wheeling or idler variety difference in the circumference of the pulley 60 from the circumference of the pulley 56 will not result in scuffing of the belt on the pulley due to differential between the circumferential pulley speed and the linear feed per minute of belt travel at either the center or the edges. Therefore, although the radius of curvature and hence the difference in diameter between the ends and the center of the pulley 36 of the first embodiment are definitely limited by the possibility of excessive scuffing between the drive pulley surface and the belt, such limitation is not applicable in the embodiment of FIG. 4 with the result that it is possible to use a greater difference in diameter (higher crown) with a possible greater reduction of the belt side height for increased advantage in the greater reduction of the vertical dimension of the reversing apparatus of this invention.

It is further to be realized that other ways of achieving this reduction or elimination of scuffing would include the possibility of using a pulley assembly comprising a cylindrical or relatively straight drive pulley of polished metal with the central portion built up to the required height for producing the effective radius of curvature or difference in diameter between the central portion and end portions by the application of suitable rubber or other surface forming material to only the axially central portion of the drive pulley such as that represented by pulley 56 of FIG. 4 while the rest of the pulley of a smaller diameter represented by the pulleys 60 of FIG. 4 would be the original polished metal surface of the basic pulley with the result that the central portion would be the only drive portion of the pulley assembly with the belt relatively free to slide on the pulley end surface portions since they are metallic and very smooth with relatively small friction and consequent reduction in wear from the scuffing possibly present in use of the original fully rubber covered drive pulley assembly such as that shown at 36 in FIG. 2.

The advantages of the immediately above described third embodiment over that of the second embodiment (FIG. 4) or first embodiment (FIG. 2) resides in, first of all, the reduction in cost since production of a straight metal pulley is much cheaper than the production of either the triple pulleys in FIG. 4 or the crowned pulley 36 of FIG. 2 and with relation to the triple pulleys of FIG. 4 the single pulley of the third embodiment would have greater strength in the radial direction to support the large tensioning forces to be expected on the reversing pulleys of such a laterally flexible belt.

Preferred embodiments of the instant invention having been hereinabove described and shown, variations in the application of the invention are to be expected. The scope of this invention is to be limited only by the scope of the claims appended hereto.

What is claimed is:

1. In a transfer terminal for a mobile belt conveyor having a transversely flexible self-troughed conveyor belt with a horizontal base portion and obliquely raised side portions producing a given side height, the improvement comprising: a belt reversing pulley means having an effective pulley length substantially equal to the width of said belt base portion; said pulley means forming a crowned pulley assembly with a ratio of effective crown radius to pulley major diameter no greater than about four to one; said crowned pulley being cooperable with said belt to substantially reduce the side height from said given height while said belt is in contact with said pulley means.

2. In a transfer terminal as specified in claim 1 the further improvement wherein; said pulley means includes a metallic core pulley and a pulley surface rubber covering.

3. A transfer terminal as specified in claim 2 wherein said rubber covering is present only on the central surface portion and is of a thickness to produce in conjunction with the end surfaces of said crowned pulley a ratio of effective crown radius of curvature to major pulley diameter no greater than about four to one.

4. A transfer terminal as specified in claim 1 wherein said pulley means comprises a central pulley mounted on a supporting shaft and two smaller diameter end pulleys axially equally spaced from respective ends of said central pulley and mounted on said shaft.

5. A transfer terminal as specified in claim 4 wherein said central pulley is keyed to said shaft and said end pulleys are free to rotate with respect to said shaft.

6. A transfer terminal as specified in claim 1 wherein said pulley means has a low friction surface.

7. A transfer terminal as specified in claim 1 additionally comprising a support frame for said reversing pulley means, a wheeled mobile support unit pivotally supporting said frame, said support unit having a set of wheel elements on each side thereof, drive means drivingly connecting all of the wheels of a given set of said wheels to provide synchronized rotation of said wheels of said given set, steering of said mobile support unit being accomplished by speed variation between the two sets of wheels.

8. A method of reversing a transversely flexible self-troughed conveyor belt having a base portion and a given side height comprising the step of training such a belt about a crowned pulley means to reduce said side height from said given height to less than 75 percent thereof.

9. A method as set forth in claim 8 comprising the additional steps of training said belt through idler sets in troughed condition before said training about said crowned pulley and subsequently passing the inner surface of the base portion of said belt over a snubbing pulley to reform said side height.

10. A method as set forth in claim 9 wherein said snubbing pulley step assures belt contact with the crowned pulley means for at least 60 percent of its circumference.

* * * * *